United States Patent
DeSmet

(10) Patent No.: US 6,374,846 B1
(45) Date of Patent: Apr. 23, 2002

(54) SYSTEM FOR EXCERCISING THE CONTROL VALVE FOR A WATER SHUT-OFF VALVE

(75) Inventor: Charles R. DeSmet, Raleigh, NC (US)

(73) Assignee: Flologic, Inc., Raleigh, NC (US)

( * ) Notice: Subject to any disclaimer, the term of this patent is extended or adjusted under 35 U.S.C. 154(b) by 0 days.

(21) Appl. No.: 09/766,164

(22) Filed: Jan. 19, 2001

(51) Int. Cl.[7] .................................. E03B 1/04
(52) U.S. Cl. .................. 137/15.01; 137/624.12; 137/460
(58) Field of Search .............. 137/624.12, 624.11, 137/624.13, 487.5, 460, 15.01

(56) References Cited

U.S. PATENT DOCUMENTS

| | | |
|---|---|---|
| 3,416,560 A | 12/1968 | Bruno |
| 3,805,611 A | 4/1974 | Hedland |
| 3,831,632 A | 8/1974 | Young |
| 3,847,020 A | 11/1974 | Jurschak |
| 3,850,199 A | 11/1974 | Stone et al. |
| 4,180,088 A | 12/1979 | Mallett |
| 4,249,565 A | 2/1981 | Brust |
| 4,304,136 A | 12/1981 | McCabe et al. |
| 4,368,646 A | 1/1983 | Rogg |
| 4,389,901 A | 6/1983 | Lake |
| 4,424,716 A | 1/1984 | Boehringer et al. |
| 4,459,860 A | 7/1984 | Walters |
| 4,507,976 A | 4/1985 | Banko |
| 4,518,955 A | 5/1985 | Meyer |
| 4,523,480 A | 6/1985 | Inoue et al. |
| 4,589,435 A | 5/1986 | Aldrich |
| 4,630,799 A | 12/1986 | Nolan et al. |
| 4,705,060 A | 11/1987 | Goulbourne |
| 4,735,231 A | 4/1988 | Jacquet |
| 4,736,763 A | 4/1988 | Britton et al. |
| 4,794,947 A | 1/1989 | Kuramochi |
| 4,807,661 A | 2/1989 | Lewis et al. |
| 4,911,200 A | 3/1990 | Ben-Arie |
| 4,926,901 A | 5/1990 | Waltenburg |
| 4,984,601 A | 1/1991 | Anderson et al. |
| 4,986,133 A | 1/1991 | Lake |
| 5,000,224 A | 3/1991 | Olson, Jr. et al. |
| 5,004,014 A | 4/1991 | Bender |
| 5,007,453 A | 4/1991 | Berkowitz et al. |
| 5,038,820 A | 8/1991 | Ames et al. |
| 5,056,554 A | 10/1991 | White |
| 5,076,324 A | 12/1991 | Terry |
| 5,083,744 A | 1/1992 | Reinicke et al. |
| 5,086,654 A | 2/1992 | Malminen |
| 5,086,806 A | 2/1992 | Engler et al. |
| 5,090,436 A | 2/1992 | Hoch, Jr. et al. |
| 5,251,653 A | 10/1993 | Tucker et al. |
| 5,267,587 A | 12/1993 | Brown |
| 5,409,037 A | 4/1995 | Wheeler et al. |
| 5,447,173 A | 9/1995 | Kazama et al. |
| 5,474,105 A | 12/1995 | Able et al. |
| 5,503,175 A | 4/1996 | Ravilious et al. |
| 5,568,825 A | 10/1996 | Faulk |
| 5,578,763 A | 11/1996 | Spencer et al. |
| 5,638,847 A | 6/1997 | Hoch, Jr. et al. |
| 5,650,564 A | 7/1997 | Wodeslavsky et al. |
| 5,771,920 A | 6/1998 | Jewett et al. |
| 5,782,263 A | 7/1998 | Isaacson, Jr. et al. |
| 5,794,653 A | 8/1998 | DeSmet et al. |
| 5,971,011 A | * 10/1999 | Price ............... 137/624.12 X |
| 6,263,905 B1 | * 7/2001 | Yokota et al. ............ 137/413 |

* cited by examiner

Primary Examiner—Kevin Lee
(74) Attorney, Agent, or Firm—Coats & Bennett, P.L.L.C.

(57) ABSTRACT

A water shut-off valve assembly comprises a valve that is moveable by a motor between open and closed positions. The water shut-off valve assembly is adapted to be connected to a water line. A sensor is also associated with a valve assembly for sensing leakages that occurred downstream from the valve assembly. A controller is operatively connected to the water shut-off valve assembly for actuating the electric motor which in turn actuates the valve therein. From time to time, the water shut-off valve assembly exercises or moves the valve within the valve assembly so as to prevent the valve from becoming clogged due to inactivity over a period of time.

25 Claims, 5 Drawing Sheets

SYSTEM FOR EXCERCISING THE CONTROL VALVE FOR A WATER SHUT-OFF VALVE

BACKGROUND OF THE INVENTION

The present invention is related to water shut-off valves for domestic and commercial settings and particularly to a water shut-off valve that is periodically manipulated to prevent failure thereof.

It is known to provide automatic water shut-off valves that have the ability to sense a water leak or accumulation of water and automatically close the valve so as to prevent further leakage and damage. For example, see the disclosures found in U.S. Pat. Nos. 5,771,920 and 5,794,653 as well as U.S. patent application Ser. No. 09/416,132. Further, disclosed therein is a teaching that both small trickle leaks and catastrophic leaks may be sensed and the shut-off valve actuated. Still further, disclosed therein is a controller that may be programmed to call a monitoring service or an attendant, and/or be programmed for home and away modes. An active mode assumes normal water use conditions and does not shut off for detected water flow events such as a shower running or the like. An away mode is a tighter threshold that will allow small water flow conditions such as when a toilet is refilled to compensate for evaporation or automatic ice making devices, but not for sustaining trickle leaks, burst washing machine hoses, showers or the like. Such modes may be particularly useful for vacation homes where occupants are sporadic and leak detection and shut-off are needed more than in an occupied house where a resident may detect and deal with the leak.

While these products and many others do exist in the field of water shut-off valves, there remains a problem in that the valves may fail when called upon to close. Many rural and municipal water systems have some degree of particulate matter suspended therein. This matter may gum up the valve preventing closure at the desired time. Further, many water systems convey water with chemicals disposed therein. Over time, these chemicals may corrode or damage the mechanism of the shut-off valve. Corrosion, just as much as the suspended matter, may clog the valve, preventing closure at the desired time.

SUMMARY OF THE INVENTION

The present invention comprises a controller that periodically exercises the shut-off valve so as to prevent or minimize the accumulation of valve clogging matter or corrosion, or simply from time to time break up matter that might tend to cause the valve to clog. In one embodiment, the shut-off valve is exercised during away periods so as to not disrupt normal operation of the water system serving the building. In another embodiment, the shut-off valve is exercised during non-peak use times. In still a third embodiment, the valve may be exercised upon a manual trigger event. Additionally, the shut-off valve may be exercised in other ways.

DETAILED DESCRIPTION OF THE INVENTION

Figure 1:
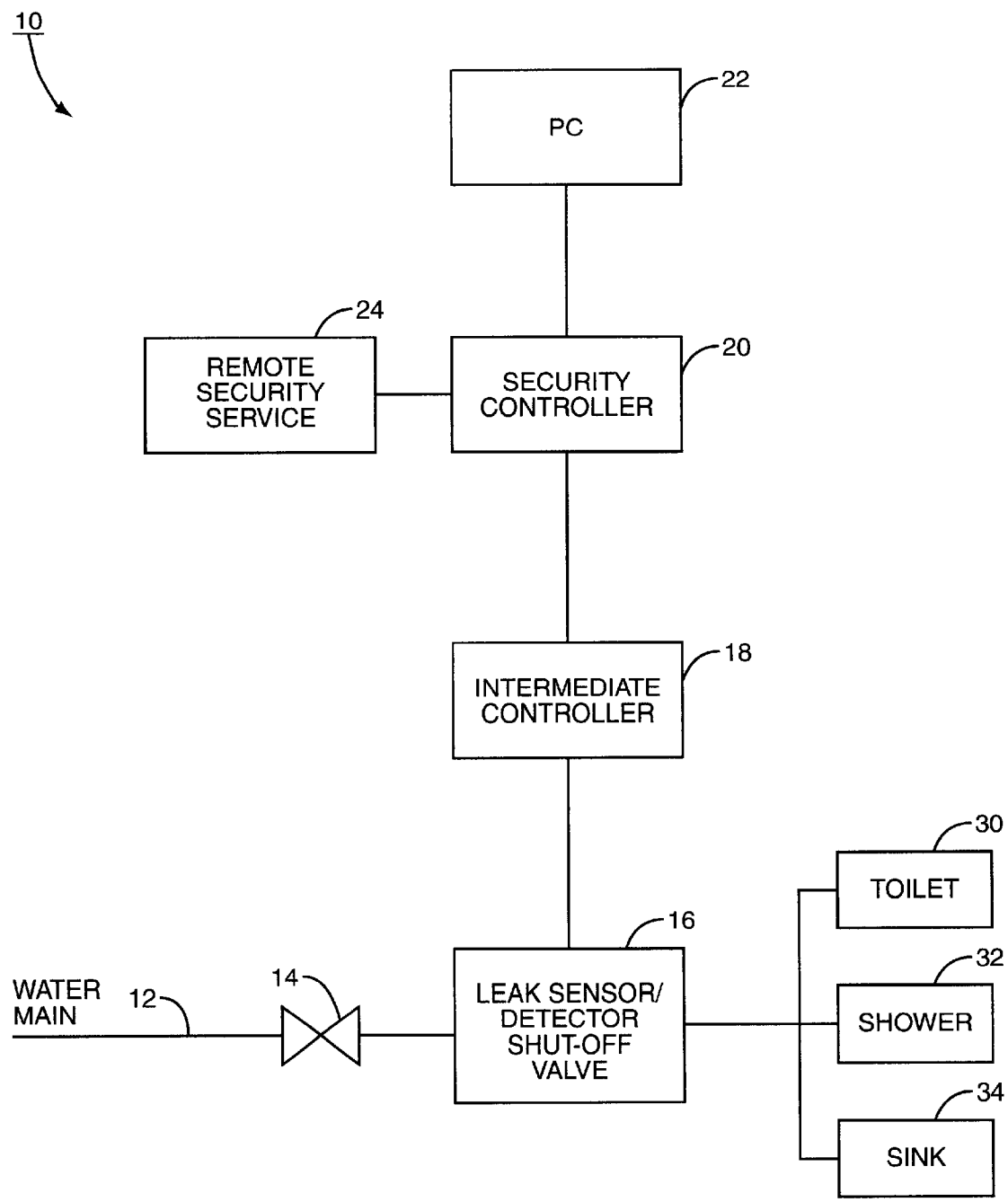
FIG. 1 illustrates a schematic diagram of an exemplary embodiment of a water shut-off system.

An exemplary water shut-off system 10 is illustrated in FIG. 1. In particular, water shut-off system 10 comprises a water main 12, a main valve 14, and a combined flow sensor and shutoff valve 16. The shut-of valve 16 is typically actuated by an electric motor, solenoid or some other power source. Optionally, several other components may also be present in the water shut-off system 10, including an intermediate controller 18, a security controller 20, and a personal computer (PC) 22.

Water main 12 passes through main valve 14, which may be a conventional manual valve, and supplies water to internal water consuming entities such as a toilet 30, a shower 32, and a sink 34. Other water consuming entities such as lawn sprinklers, dishwashers, clothes washers and the like may also be present depending on the nature of the building.

Flow sensor and shut-off valve 16 may be interposed in water main 12 between main valve 14 and the water consuming entities. Exemplary flow sensors and shut-off valves are illustrated in U.S. Pat. Nos. 5,771,920; 5,794,653; 3,805,611; 5,038,820; and 4,705,060 as well as U.S. patent application Ser. No. 09/416,132, the disclosures of which are incorporated herein in their entireties. Other sensor and shut-off valves may also be used. These sensors and shut-off valves need not be unitary, but can be spaced from one another such as disclosed in U.S. Pat. No. 4,705,060. A further discussion of an exemplary valve 16 is presented below with respect to FIGS. 2, 3A, & 3B.

In the disclosed embodiment, the intermediate controller 18 acts as the intelligence of the flow sensor and shut-off valve 16. In particular, the intermediate controller 18 evaluates whether the flow sensor 16 has detected a leak of sufficient severity to merit actuating the shut-off valve to close the water main 12. Intermediate controller 18 may communicate with the security controller 20. Security controller 20 may in turn communicate with the personal computer 22 and remote security service 24. Security controller 20 therefore may comprise the appropriate telephone, cable, or DSL connections as needed or desired. Remote security service 24 may be a housekeeper, a plumber, a service such as ADT® or the like. In the event of a leak, they are notified and appropriate contacts are made.

Personal computer 22 may be used to program the security controller 20 and the intermediate controller 18 if needed or desired. Further, it may generate telephone calls or emails to the owners of the building alerting them as to the existence of a detected leak.

For the purposes of the present invention, the security controller 20, the personal computer 22, and the remote security service 24 are optional. Further, the intermediate controller 18 may be integrated into a single unit with the flow sensor and shut-off valve 16 if needed or desired.

Intermediate controller 18 comprises a memory device such as RAM, ROM, EEPROM, flash memory or the like coupled with a microprocessor. Software may be installed thereon or the controller 18 may be hardwired or adopted for wireless operation to perform the duties of the present invention as needed or desired. Intermediate controller 18 may have a user interface or require programming through an auxiliary device such as a personal computer 22.

Intermediate controller 18 may further be programmed to recognize active (such as home) or away modes as disclosed in the previously incorporated patent application. Note that the previously incorporated application may refer to the active mode as a "home" mode. The terms are meant to be synonymous as used herein. These modes reflect the variable use levels associated with an active building and an inactive building. Water demands are minimal when in the away mode and shut-off water flow thresholds would be set correspondingly low. In contrast, in an active mode, the occupants may have water demands that result in relatively constant medium to low flow situations, such as for example, when the lawn is being watered. Showers, toilet flushing, and the like also have characteristic water demands that are accommodated without triggering a shutoff in the home or active mode. Those of ordinary skill in the art may determine other acceptable water use profiles based on events that routinely occur in the building.

Figure 2:
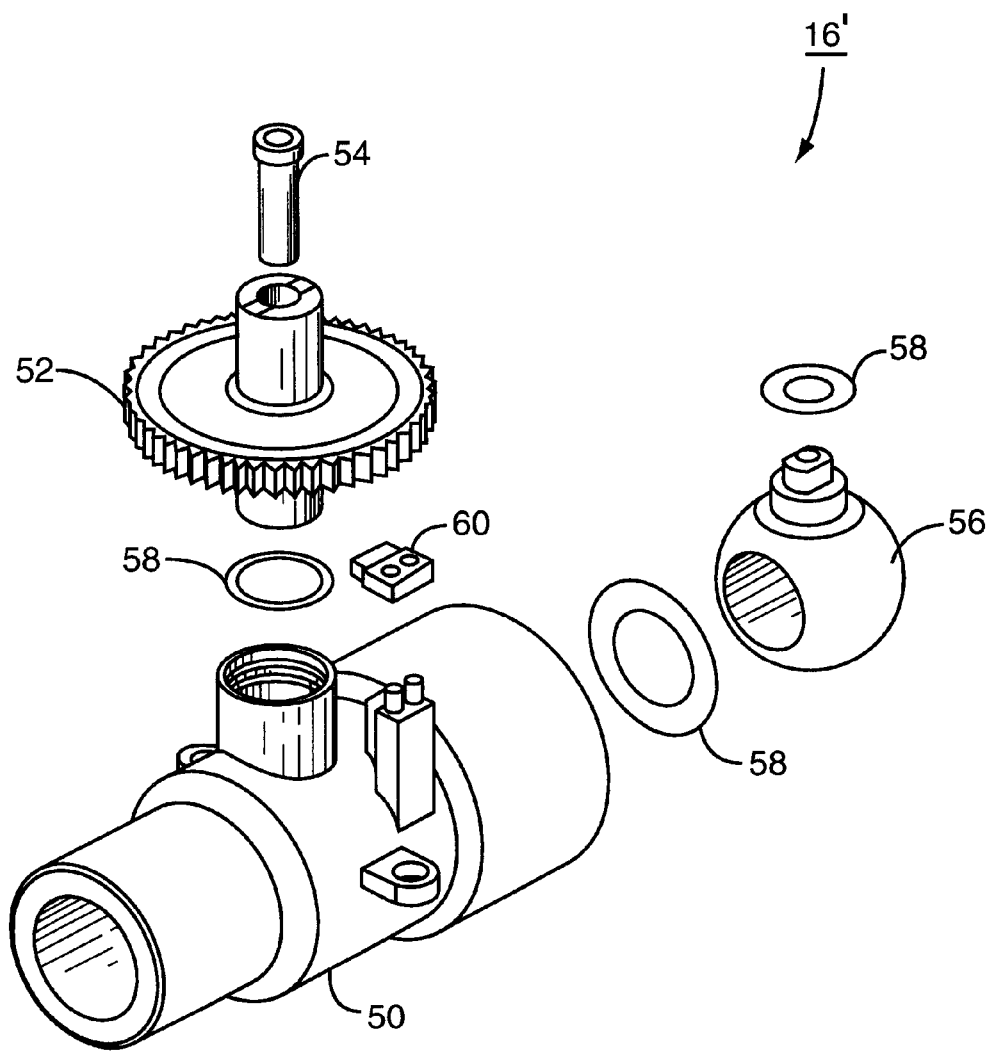
FIG. 2 illustrates a front perspective exploded view of an exemplary valve such as may be used in the system of claim 1.

An exemplary valve 16' forms part of the flow sensor and shutoff valve 16 and is illustrated in FIG. 2. Valve 16' comprises an inlet tube 50, an output gear 52, a screw 54, a ball 56, a plurality of o-rings 58, and an inlet tube switch 60. Ball 56 is positioned within the inlet tube 50 and actuated by movement of output gear 52. This is similar to the construction presented in the previously incorporated application, and for a further explanation, the interested reader is directed there.

Figure 3A:
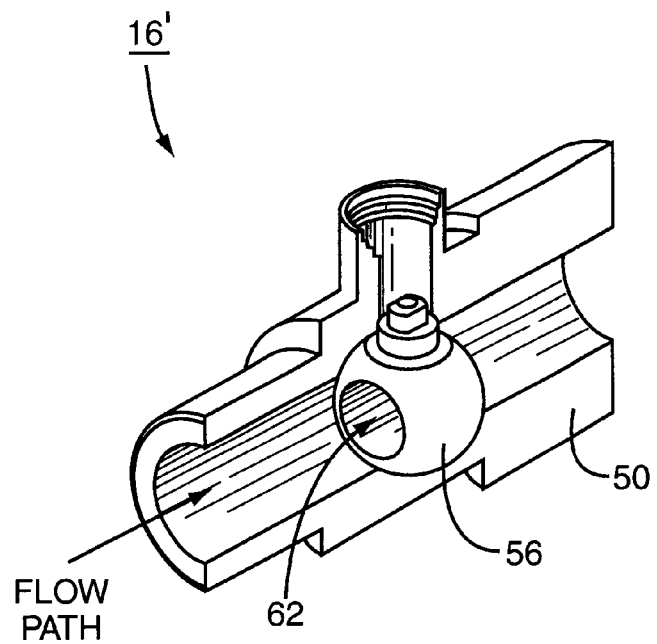
FIGS. 3A & 3B illustrate a cross-sectional view of the valve of FIG. 2 in an open and closed posture respectively.
Figure 3B:
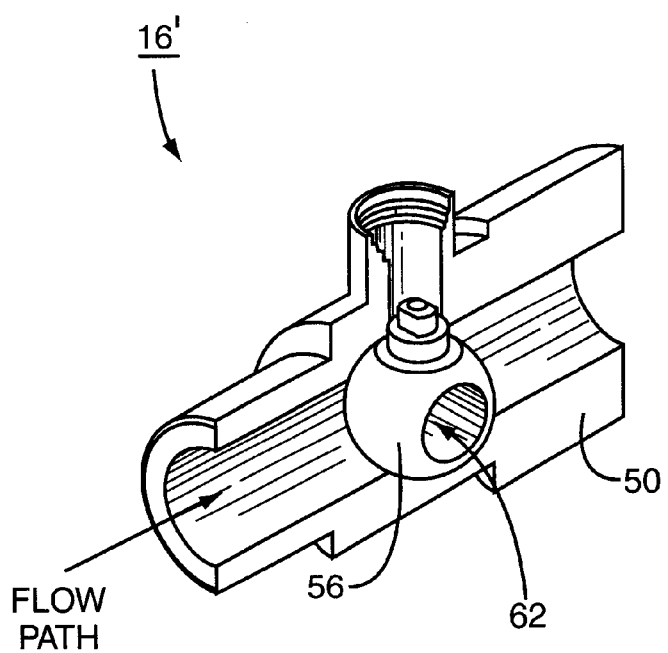

As illustrated in FIGS. 3A & 3B, this exemplary valve 16' may be open (FIG. 3A), wherein the aperture 62 in the ball 56 is generally collinear with the flow path of the inlet tube 50, or closed (FIG. 3B) wherein the aperture 62 is generally perpendicular to the flow path of the inlet tube. In this embodiment of the valve 16', closing the valve 16' from an open position comprises rotating the ball 56 a quarter turn counter-clockwise. Opening the valve 16' from a closed position comprises rotating the ball 56 a quarter turn clockwise. Other arrangements are possible and contemplated.

Figure 4:
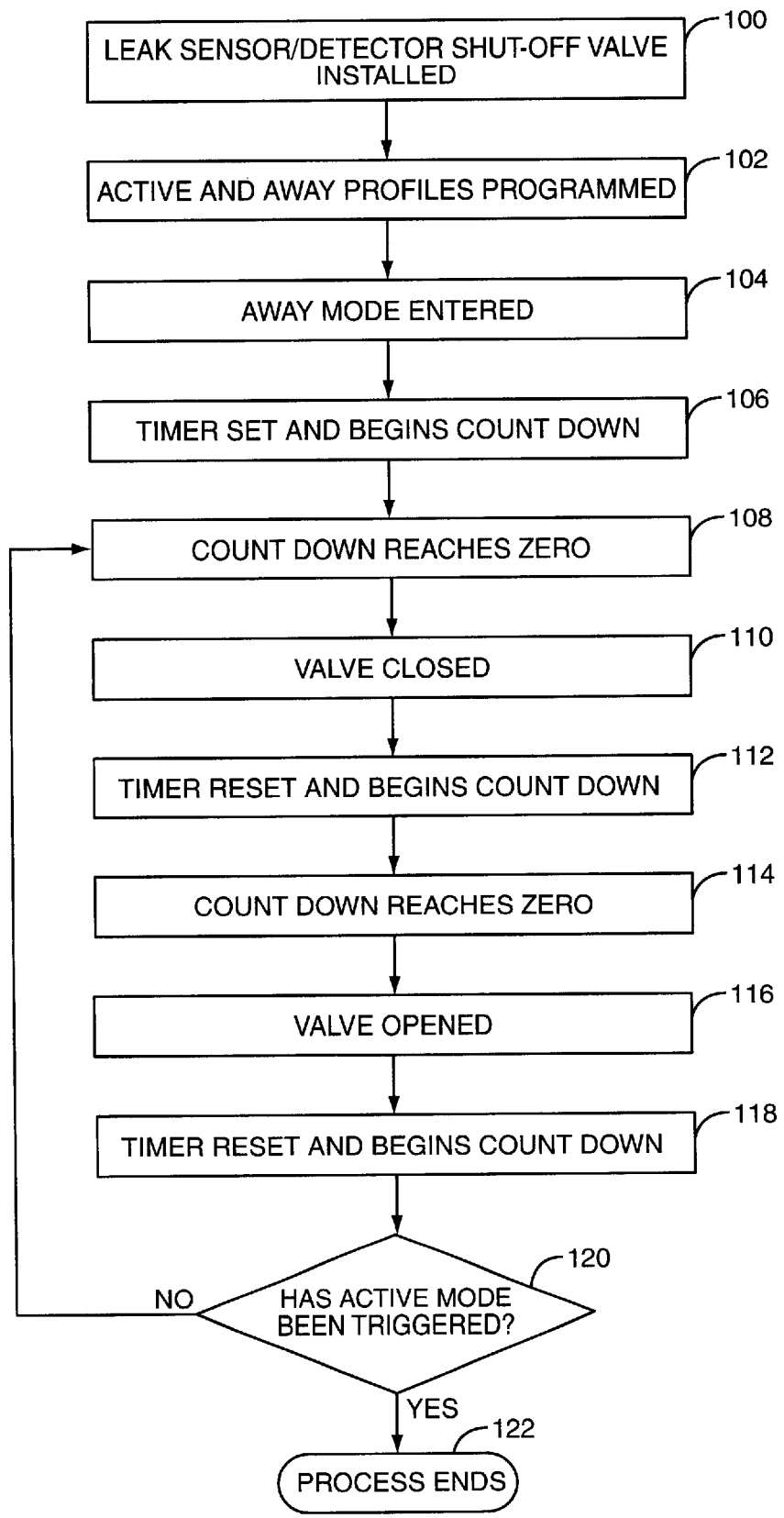
FIG. 4 illustrates a flow chart illustrating a first embodiment of an exercising regimen for a water shut-off system.
Figure 5:
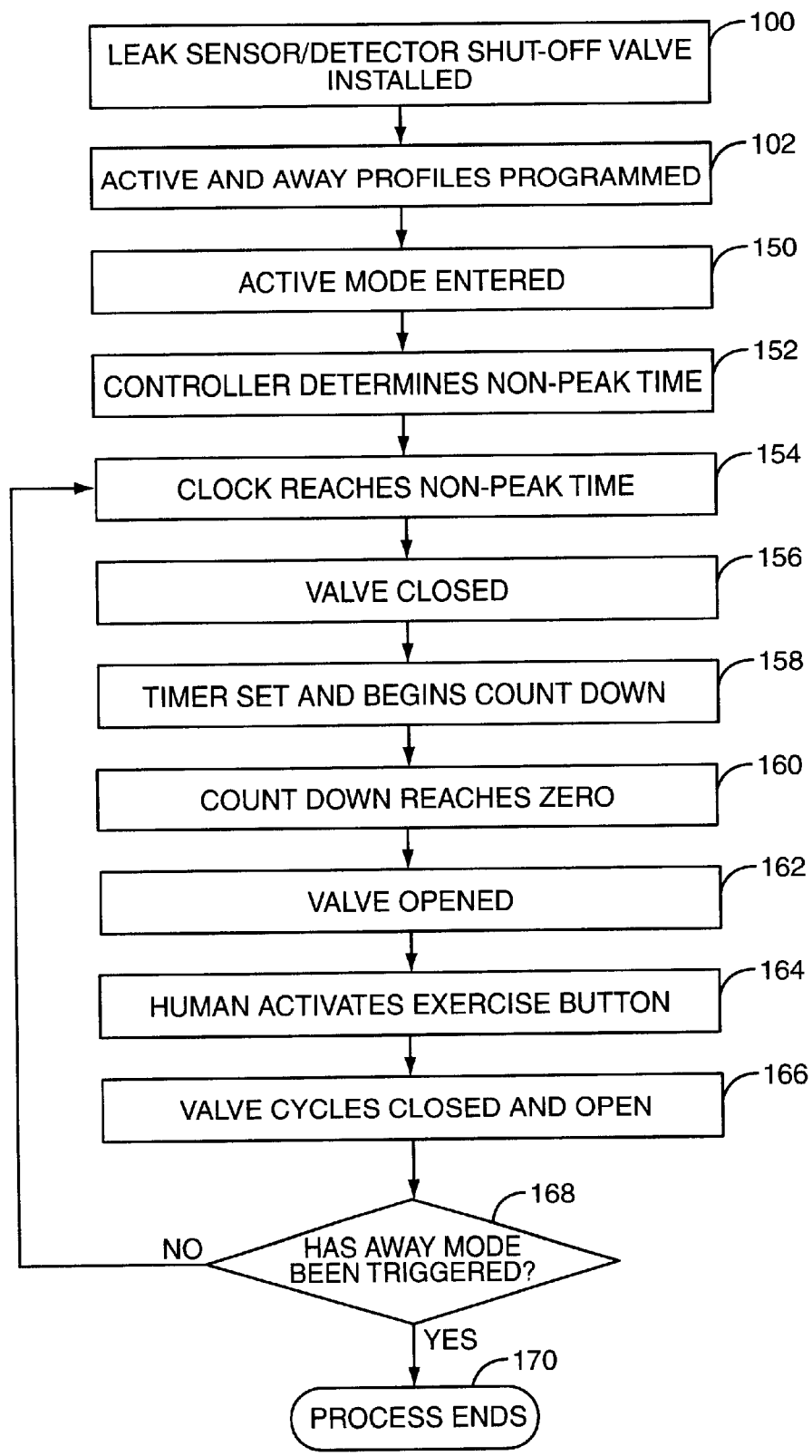
FIG. 5 illustrates a flow chart illustrating a second embodiment of an exercising regimen for a water shut-off system.

Intermediate controller 18 or an equivalent structure such as the personal computer 22 or a controller within the flow sensor and shut-off valve 16 is programmed to effectuate the following functionality as illustrated in FIGS. 4 and 5. In particular, with reference to FIG. 4, the flow sensor and shut-off valve 16 is installed within the building (block 100). The active and away modes are programmed such that threshold values for acceptable flow rates are established for both modes (block 102). This may be done empirically or according to standard profiles as needed or desired.

The occupant then leaves the building activating the away mode (block 104). A timer associated with the controller 18 is set and begins to count down (block 106). Eventually, the count down will reach zero (block 108). Alternatively, the timer may count up as needed or desired, in which case, the count up will eventually exceed a predetermined threshold. In either case, the end result is the passage of a predetermined amount of time, such as a few minutes, an hour, or even a day or two . Upon the passage of the appropriate amount of time, the valve is closed (block 110).

A timer, perhaps the same one, or perhaps a second one as needed or desired, is set and a count down begins (block 112). This second count down reaches zero (block 114). Again, this could be a count up with a predetermined threshold. This second count may be shorter than the initial count, on the order of a minute or less. In one embodiment, this time is ten to fifteen seconds. Upon the passage of the desired amount of time, the valve is cycled all the way open (block 116). The term "exercising" as used herein comprises at least partially moving or partially closing the valve 16'. Exercising specifically includes closing a valve 16' all the way and then opening the valve 16' all the way. Likewise, if the valve 16' is normally in a closed position, exercising comprises at least partially opening the valve 16' and then closing the valve 16'.

After the valve has been exercised, that is after the valve has been closed and opened, the system may be designed to exercise the valve from time to time while the system is in the away mode. This is also illustrated in FIG. 4. After the valve is open (block 116), the timer is reset and begins a countdown (block 118). Once the timer has reached zero, if the system has been changed from the away mode to the active mode, then the process ends. However, if the system is still in the away mode, the process or method is essentially recycled back to block 108 such that when the countdown reaches zero, the valve is closed and thereafter some amount of time is allowed to elapse after which the valve is returned to the open position.

Therefore, it is appreciated that when the system is placed in the away mode, that the valve can be exercised after the passing of a predetermined amount of time. Thereafter, the valve may be exercised from time to time during the time period in which the system remains in the away mode.

A similar process may occur for the active mode, as illustrated in FIG. 5. The flow sensor and shut-off valve 16 is installed (block 100) and the active and away modes are programmed as previously described (block 102). The active mode is entered (block 150). Controller 18 determines a non-peak time (block 152). This may be done by programming the controller 18, empirical data sampling, or other technique as needed or desired. A non-peak time comprises a time at which water usage is zero or at a minimum. In most households this would most likely be between midnight and five AM. Of course this may vary from household to household depending on schedules, working shifts, or the like.

A clock associated with the controller 18 reaches that non-peak time (block 154). The valve in the flow sensor/ detector shut-off valve 16 is closed (block 156). This closing step may be identical to the closing step of block 110, and may be, for example, a quarter closing. A timer associated with the controller 18 is set and a count down begins (block 158). The count down reaches zero (block 160). Again, this may be a count up and a threshold if desired. After the passage of an appropriate amount of time, the valve is opened (block 162).

As a further feature a human may manually actuate an exercise button (block 164). This button may be positioned on the flow sensor and shut-off valve 16 or on the intermediate controller 18 or other position as needed or desired. This actuation triggers the valve to cycle closed and open as previously described (block 166). Appropriate visual or audible indicia may be provided to indicate the successful completion of the manual exercising. Note that this manual exercising need not occur during a non-peak time, although it might temporarily impose an inconvenience for occupants of the building.

Intermediate controller 18 monitors to determine if the away mode has been triggered (block 168). If the answer is no, the process repeats in the active mode cycle, with manual exercising occurring as needed or desired. Again, the periodic exercising of the valve 16' helps prevent failure thereof.

If the away mode has been triggered, this process ends, and the process of FIG. 4 may begin.

While this process is particularly well suited for ball valves within the flow sensor and shut-off valve 16, it may also be performed with other valves as well. Further, the exact location of the programming and memory associated with the present invention is contemplated as being closely associated with the flow sensor and shut-off valve 16, it may also be remote therefrom.

As another possible trigger event for the valve exercising is the actuation of a mode. Thus, when an operator actuates, for example, the away mode, the valve 16' is exercised immediately or close in time thereafter. If the process of exercising the valve 16' fails for some reason, an alarm (audible or visual) may be generated and the operator may deal with the situation before leaving if desired. Equally possible would be to exercise the valve 16' immediately after the home or active mode or other such modes were selected.

From the foregoing specification, it is appreciated that the shut-off valve can be exercised periodically, from time to time, manually, or in response to a programmed controller. It will be appreciated that this exercising activity will exercise other related or associated components such as the drive motor and the drive train interconnecting the drive motor with the on/off valve.

In the above discussion, the shut-off valve is basically described in connection with a system or method where flow is sensed. In this regard, the system is programmed or designed to shut-off or close a valve in response to a certain water flow condition sensed by a flow sensor. It is to be understood that the shut-off valve can be used in conjunction with other types of detection and sensing devices, and in those cases there is still the need to exercise the shut-off valve. For example, a system may be provided where there is a moisture or water detector or sensor. In such a case the shut-off valve would be automatically moved to a closed position when water or moisture is sensed. In this particular case, there would still be a need to exercise the shut-off valve from time to time and that could be accomplished in the same manner as described above.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A water shut-off system, comprising:
    a normally open water shut-off valve;
    a sensor for sensing a flow of water through the valve; and
    a controller for actuating and closing the water shut-off valve in response to the sensor sensing a leak condition and for exercising the valve, by at least partially closing the valve and returning the valve back to a normal open position, from time to time independently of a need to control water flow through the water shut-off valve.

2. The water shut-off system of claim 1 further comprising a manual exercise button adapted to cause said controller to exercise the valve.

3. The water shut-off system of claim 1 wherein said controller is programmed with active and away modes.

4. The water shut-off system of claim 3 wherein said controller periodically exercises said valve when in said away mode.

5. The water shut-off system of claim 3 wherein said controller exercises said valve during non-peak times when in said active mode.

6. The water shut-off system of claim 5 wherein said non-peak times are programmed into said controller.

7. The water shut-off system of claim 5 wherein said non-peak times are determined empirically by said controller.

8. The water shut-off system of claim 1 wherein said controller actuates said valve by closing said valve a quarter turn and subsequently opening said valve a quarter turn.

9. A method of maintaining a valve in a water shut-off system, comprising:
    programming a controller for active and away modes;
    associating the controller with a normally open valve; and
    periodically closing and opening the water shut-off valve pursuant to a command from said controller in the absence of the detection of a leak event.

10. The method of claim 9 wherein periodically closing and opening the valve comprises periodically closing and opening the valve when in said away mode.

11. The method of claim 9 wherein periodically closing and opening the valve comprises periodically closing and opening the valve during a non-peak time when in said active mode.

12. The method of claim 9 wherein periodically closing and opening the valve comprises closing the valve a quarter turn and opening the valve a quarter turn.

13. The method of claim 9 further comprising accepting manual input to exercise the valve.

14. The method of claim 11 further comprising programming said non-peak time.

15. The method of claim 11 further comprising determining said non-peak time with empirical data collected by the controller.

16. A method of controlling a flow of water through a water shut-off valve and exercising the water shut-off valve from time to time, comprising:
    sensing the flow of water through said water shut-off valve;
    closing the water shut-off valve in response to detection of a leak event; and
    exercising the water shut-off valve from time to time independently of a desire to control water flowing through the water shut-off valve.

17. A method of maintaining a normally open valve in a water shut-off valve assembly so as to generally prevent the valve from clogging comprising exercising the normally open valve, by at least partially closing the valve and returning the valve back to a normal open position, from time to time independently of a need to control water flow through the water shut-off valve.

18. The method of claim 17 further comprising programming a controller that is operatively connected to the water shut-off valve assembly to exercise the valve.

19. The method of claim 17 wherein the water shut-off valve is operative to operate in multiple modes and wherein the method further comprises exercising the valve in response to a mode change.

20. The method of claim 19 wherein the water shut-off valve assembly is operatively connected to a controller and wherein the controller is programmed to exercise the valve in response to a mode change with respect to the water shut-off valve assembly.

21. The method of claim 20 wherein the controller is programmed for both an active mode and an away mode and is operative to exercise the valve in response to the away mode being actuated.

22. The method of claim 19 wherein in exercising the valve, the valve is turned at least a partial turn.

23. The method of claim 22 wherein the valve comprises the form of a ball valve and wherein the method comprises first turning the ball valve through a selected rotation, pausing and thereafter turning the ball valve through another selected rotation.

24. The method of claim 17 wherein the shut-off valve assembly is operatively connected to a controller, and wherein the method comprises programming the controller to exercise the valve at one or more times during a time period.

25. The method of claim 17 wherein the water shut-off valve assembly is operatively connected to a controller and wherein there is provided a button for manually actuating the controller so as to cause the valve to be exercised.

* * * * *